L. E. WATERMAN.
PLOW.
APPLICATION FILED MAY 23, 1916.

1,215,754.

Patented Feb. 13, 1917.

Inventor:
Lewis E. Waterman
By Pond + Wilson
Attys.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

PLOW.

1,215,754.  Specification of Letters Patent.  Patented Feb. 13, 1917.

Original application filed December 16, 1915, Serial No. 67,202. Divided and this application filed May 23, 1916. Serial No. 99,452.

*To all whom it may concern:*

Be it known that I, LEWIS E. WATERMAN, a citizen of the United States, residing at Rockford, in the county of Winnebago and State of Illinois, have invented certain new and useful Improvements in Plows, of which the following is a specification.

This application relating in general to wheeled plows is a division of my application, Ser. No. 67,202, filed Dec. 16, 1915, and has particular reference to means employed to rock a pair of crank axles relatively and in unison to level the plow frame and to raise and lower the same.

In plows of this character, it has been customary to employ in various ways an adjustable hand lever connected with one or more crank axles for rocking the same to adjust the plow frame with respect to the ground, and in the event that power operated means are employed for raising and lowering the frame, the said hand lever, due to its permanent connection with the crank axles, is swung back and forth during the power operated raising and lowering movements and becomes a source of danger to any one within range of its movement.

My invention aims to provide adjusting means of the character described including an adjustable hand lever mounted so that when the crank axles or other movable plow frame supporting means are rocked or moved to raise and lower the frame the hand lever will be carried back and forth relatively to the frame in a substantially parallel movement and thus traverse a comparatively short distance as compared to swinging on a pivot through a large arc.

Referring to the drawing—

Figure 1:
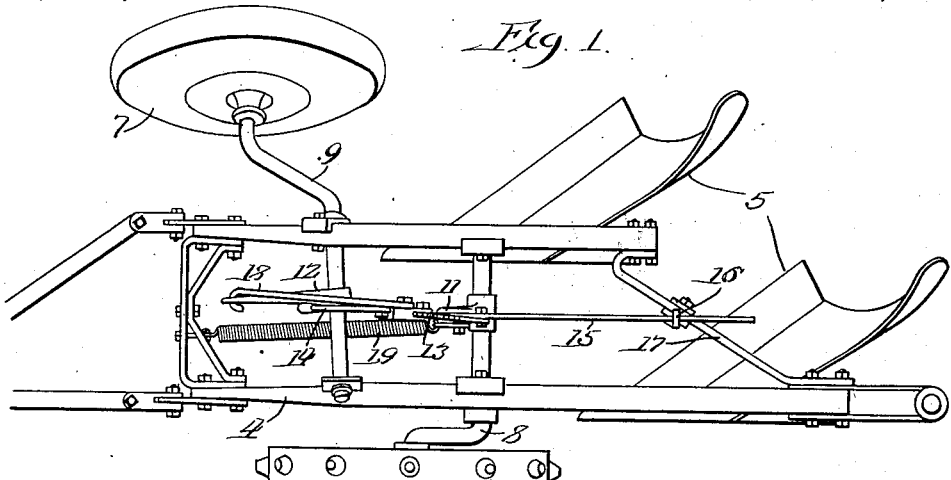
Figure 1 is a plan view of a wheeled plow embodying my improvements.
Figure 2:
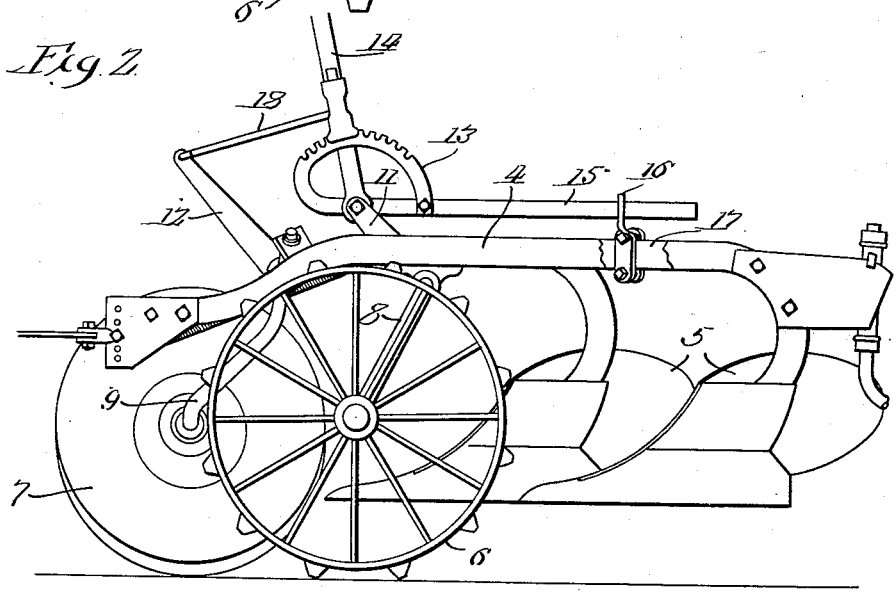
Fig. 2 is a side view thereof.

In this invention I have provided a novel means for connecting the rock shafts of a pair of crank axles including an adjustable hand lever whereby the crank axles may be rocked relatively by means of the hand lever or other means and whereby when rocked in unison the hand lever will travel in a substantially parallel movement as distinguished from swinging on its fulcrum. This feature embodied in a wheeled plow in a permanent connection between a pair of crank axles serves as means to adjust the crank axles relatively to level the plow and to move the crank axles in unison to raise and lower the plow. When power operated means is employed to raise and lower the plow, for instance as described in the above mentioned application, the adjusting lever in the connection between the crank axles is moved through a comparatively short path so as not to be an element of danger. In other words, its movement is substantially parallel as distinguished from swinging on a pivot. To illustrate this feature, I have shown on the drawing a wheeled plow, various parts of which not essential to an understanding of the invention, have been omitted.

The plow frame designated generally by reference character 4 consists mainly of a pair of plow beams carrying moldboard plows 5. The frame is supported at its front end by means of a land wheel 6 and a furrow wheel 7 mounted on crank axles 8 and 9 respectively, suitably journaled on the frame and supported at its rear end by a rear furrow wheel (not shown), as is well understood in the art. It will be noted that the front furrow wheel crank axle is journaled on an axis inclined forwardly and downwardly so that the wheel is canted to tread in the corner of a furrow and effectively maintain its working position and carry the side thrust of the plows. Suitable draft means may be employed, and as described in my above mentioned application power operated means may be employed to rock the crank axles to raise and lower the plows.

Figure 3:
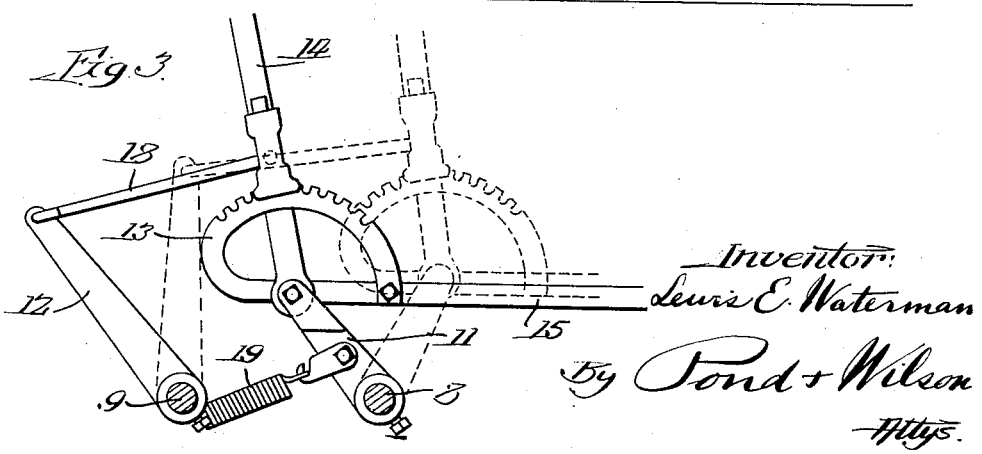
Fig. 3 is a fragmentary view showing more clearly the connection between the crank axles.

Referring to Fig. 3, rocker arms 11 and 12 are fixedly secured to the rock shaft or pivot portions of the crank axles 8 and 9 respectively, and extend upwardly and forwardly therefrom in parallel relation. The rocker arm 11 has pivotally mounted on its outer end a notched sector 13 and a hand lever 14 equipped with the usual spring latch coöperating with the sector. The sector is held against rotation on its pivotal mounting by means of a rod 15 formed integral with the sector and passed through the eye of a keeper or guide 16 secured to an element connected with the frame, in this instance, to a fixed member such as a brace 17 connecting the rear ends of the plow beams. It will be noted that the guide 16 is positioned in the horizontal plane of the pivot of the hand lever 14, so that as the rocker arm 11 is swung back and forth the notched sector will be held by the guide 16 against pivotal movement relatively to the frame, consequently, the hand lever will be moved back and forth in a substantially parallel movement. Positive connection is established between the rocker arms 11 and 12 through the medium of a link 18 pivotally connecting the outer end of the rocker arms 12 and the lever 14. Since the rocker arm 12 swings on an axis non-parallel with the pivot axis of the rocker arm 11, the link 18 is provided with a hooked end passed through an eye in the rocker arm 12 to allow for relative lateral movement between these parts as the rocker arms are swung on their pivots. A contractile spring 19 connecting the rocker arm 11 and the fore end of the plow frame exerts a force tending to raise the said frame.

By reason of the novel connection between the crank axles, it will be apparent that with the hand lever 14 locked to the sector a positive and permanent connection is established between the crank axles so that the same will rock in unison. It will be noted that no means is provided for holding the crank axles against turning in their journals, since as mentioned above a power operated means (not shown) or any other suitable means may be employed to control the rocking movement of the crank axles 8. In other words, suitable means coöperating with one of the crank axles may be employed to hold the same fixed with respect to the frame and to rock said crank axle to raise and lower the plows. The purpose of the hand lever 14 in the connection is to provide means whereby the furrow wheel may be vertically adjusted with respect to the land wheel 6, so that the plows may be leveled, it being apparent that during such adjustment the sector 13 is held against rotation on its pivot by the rod 15.

The peculiar connection between the crank axles, while providing a simple and practical means whereby the crank members may be rocked relatively and in unison, also affords several advantages of considerable importance. It will be remembered that when the plow is automatically raised and lowered by power operated means, the crank axles 8 and 9 are rocked in a quick movement, more rapid during the lowering than during the raising, consequently the hand lever is swung either backwardly or forwardly with each raising and lowering operation in a similar quick movement. In the event that this adjusting lever is fixedly secured directly to either of the crank members 8 or 9, or pivotally mounted so as to swing directly on its pivot, it will be apparent that during the raising and lowering operation it would swing through a considerable arc and be a source of danger to any person within its range of movement and that this danger is accentuated by the rapidity of movement of the several parts when the plow is lowered. In my improved construction, however, the hand lever is not swung through an arc at each raising and lowering operation of the plow, but it is moved backwardly and forwardly a comparatively short distance in a substantially parallel movement as is clearly illustrated in the several positions indicated in Fig. 3. This arrangement also permits hitching the plow comparatively close to the tractor, thereby minimizing the draft of the plow and brings the adjusting lever 14 into closer relation to the operator so that he may easily make adjustments from his seat on the tractor without danger of being injured by a wide-swinging lever such as mentioned above.

I claim:

1. In a plow, the combination of a frame, a supporting wheel therefor mounted with capacity for vertical movement relatively to the frame, an upstanding hand lever permanently connected with the wheel for adjusting it vertically to different positions from which the wheel is movable vertically with respect to the frame for raising and lowering the same, and means for causing the said hand lever to be moved back and forth in a substantially parallel movement as the frame is raised and lowered.

2. In a plow, the combination of a frame, crank members pivotally connected with the frame, a land and a furrow wheel mounted on said crank members, and a connection between the crank members including an upright adjustable hand lever whereby the crank members may be rocked in unison and may be rocked relatively by adjustment of the hand lever, the lever being so mounted that it will be moved back and forth in a substantially parallel movement upon rocking the crank members to raise and lower the frame.

3. In a plow, the combination of a frame, crank members pivotally connected with the frame, a land and a furrow wheel mounted on said crank members, an upwardly projecting arm secured to each crank member, a sector pivoted to one of the arms, said sector having a horizontally extending portion slidably engaging a frame element so as to hold the sector against swinging on its pivot with respect to the frame when the sector-carrying arm is rocked, an upright hand lever adjustably coöperating with the sector, and a link pivotally connecting the hand lever and the second mentioned arm whereby the crank members will rock in unison and may be relatively rocked by the adjustment of said hand lever and whereby also the hand lever will be moved back and forth in a substantially parallel movement when the crank members are rocked.

4. In a plow, the combination with a frame, of a pair of crank members pivoted thereon, a supporting wheel mounted on each crank member, a rocker arm secured to each crank member, and a connection between said rocker arms including a sector and a hand lever adjustably coöperating therewith and mounted so as to travel back and forth longitudinally of the plow in a substantially parallel movement as the crank members are rocked to raise and lower the plow, the hand lever being adjustable for rocking one crank member relatively to the other.

5. In a plow, the combination of a frame, a pair of crank members pivoted thereon, a supporting wheel mounted on each of said crank members, and means connecting the crank members so that they will rock in unison, said means including an adjustable hand lever adapted for rocking one crank member relatively to the other and being so mounted that upon rocking the crank members it will be moved thereby back and forth longitudinally of the plow in a substantially parallel movement.

6. The combination with a frame and a pair of rock shafts mounted thereon, of means for rocking said shafts relatively and in unison, comprising a pivotal connection between the shafts including a sector-adjustable hand lever, and means for causing the hand lever when in set connection with its sector to move back and forth relatively to the frame in a substantially parallel movement as the shafts are rocked.

7. In a plow, the combination of a frame, a pair of crank axles mounted thereon, means connecting the crank axles to rock the same relatively and in unison including an adjustable hand lever, the said lever being so mounted that when in set position it will move in a substantially parallel movement relatively to the frame as the crank axles are rocked.

8. The combination with a frame and a pair of rock shafts mounted thereon, of means for rocking the shafts relatively and in unison, comprising a rocker arm fixedly secured to each shaft, a sector pivotally mounted on one of said rocker arms, means for holding the sector against swinging on its pivot relatively to the frame as the sector-carrying arm is rocked, an adjustable lever coöperating with said sector, and a connection between the said lever and the other rocker arm whereby the rocker arms are connected and may be rocked relatively by adjusting the lever and whereby the lever during movement of the rocker shafts in unison will move in a substantially parallel movement.

LEWIS E. WATERMAN.

Copies of this patent may be obtained for five cents each, by addressing the "Commissioner of Patents, Washington, D. C."